US012500932B2

(12) United States Patent
Guo

(10) Patent No.: US 12,500,932 B2
(45) Date of Patent: Dec. 16, 2025

(54) NETWORK TRANSPORT LAYER DATA PROCESSING METHOD, AND DEVICE AND STORAGE MEDIUM

(71) Applicant: ZTE CORPORATION, Shenzhen (CN)

(72) Inventor: Tian Guo, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 156 days.

(21) Appl. No.: 18/568,817

(22) PCT Filed: Apr. 29, 2022

(86) PCT No.: PCT/CN2022/090383
§ 371 (c)(1),
(2) Date: Dec. 9, 2023

(87) PCT Pub. No.: WO2022/257643
PCT Pub. Date: Dec. 15, 2022

(65) Prior Publication Data
US 2024/0275816 A1    Aug. 15, 2024

(30) Foreign Application Priority Data

Jun. 11, 2021    (CN) .......................... 202110655627.0

(51) Int. Cl.
*H04L 29/06*    (2006.01)
*G06F 8/61*    (2018.01)
*H04L 9/40*    (2022.01)

(52) U.S. Cl.
CPC .............. *H04L 63/166* (2013.01); *G06F 8/62* (2013.01); *H04L 63/0485* (2013.01)

(58) Field of Classification Search
CPC ... H04L 63/166; H04L 63/0485; H04L 69/16; H04L 63/0428; H04L 9/40; H04L 43/18;
(Continued)

(56) References Cited

U.S. PATENT DOCUMENTS

2007/0156919 A1\* 7/2007 Potti ................... H04L 41/5003
709/238
2008/0273462 A1\* 11/2008 Klish .................. H04L 63/0428
370/235
(Continued)

FOREIGN PATENT DOCUMENTS

CN    110352400 A    10/2019
CN    111580931 A    8/2020
(Continued)

OTHER PUBLICATIONS

Chandranmenon et al., "Trading packet headers for packet processing", IEEE/ACM Transactions on Networking, vol. 4, Issue: 2, Apr. 1996.\*
(Continued)

*Primary Examiner* — Morshed Mehedi
(74) *Attorney, Agent, or Firm* — NZ Carr Law Office

(57) ABSTRACT

The embodiments of the present application relate to the field of communications. Disclosed are a network transport layer data processing method, and a device and a storage medium. The network transport layer data processing method in the present application is applied to an extended Berkeley packet filter (eBPF) program that runs in a kernel. The method comprises: acquiring a network transport layer data packet that needs to be distributed; parsing the network transport layer data packet, and determining a network transport layer data processing mode that needs to be performed on the network transport layer data packet; and processing the network transport layer data packet according to the network transport layer data processing mode.

19 Claims, 6 Drawing Sheets

(58) Field of Classification Search
CPC ..... H04L 69/321; H04L 69/326; H04L 69/22; G06F 8/62; G06F 9/44505
See application file for complete search history.

(56) References Cited

U.S. PATENT DOCUMENTS

| | | | |
|---|---|---|---|
| 2018/0288198 A1* | 10/2018 | Pope | H04L 41/16 |
| 2019/0173841 A1* | 6/2019 | Wang | G06F 9/5083 |
| 2019/0385057 A1* | 12/2019 | Litichever | H04L 63/14 |
| 2021/0058989 A1* | 2/2021 | Simsek | H04L 47/283 |
| 2022/0321532 A1* | 10/2022 | Du | H04L 43/062 |

FOREIGN PATENT DOCUMENTS

| | | |
|---|---|---|
| CN | 111818041 A | 10/2020 |
| CN | 112817597 A | 5/2021 |
| CN | 112860484 A | 5/2021 |
| JP | 2009009477 A | 1/2009 |
| JP | 2010021887 A | 1/2010 |

OTHER PUBLICATIONS

Bu et al., "Encrypted Network Traffic Classification Using Deep and Parallel Network-in-Network Models," in IEEE Access, vol. 8, pp. 132950-132959, (Year: 2020).*

Tran Viet-Hoang et al.:"Beyond socket options: Towards fully extensible Linux transport stacks", Computer Communications, Elsevier Science Publishers BV, Amsterdam, NL, vol. 162, Aug. 17, 2020 (Aug. 17, 2020), pp. 118-138, XP086268433, ISSN:0140-3664, DOI: 10.1016/J.COMCOM.2020.07.036 [retrieved on Aug. 17, 2020] abstract.

The extended European search report of the corresponding EP Patent Application No. 22819245.6 dated May 7, 2025.

(ISA/237) Written Opinion of the International Searching Authority dated Jun. 24, 2022.

International search report of the corresponding PCT Application No. PCT/CN2022/090383 mailed on Jun. 24, 2022 along with English translation thereof.

* cited by examiner

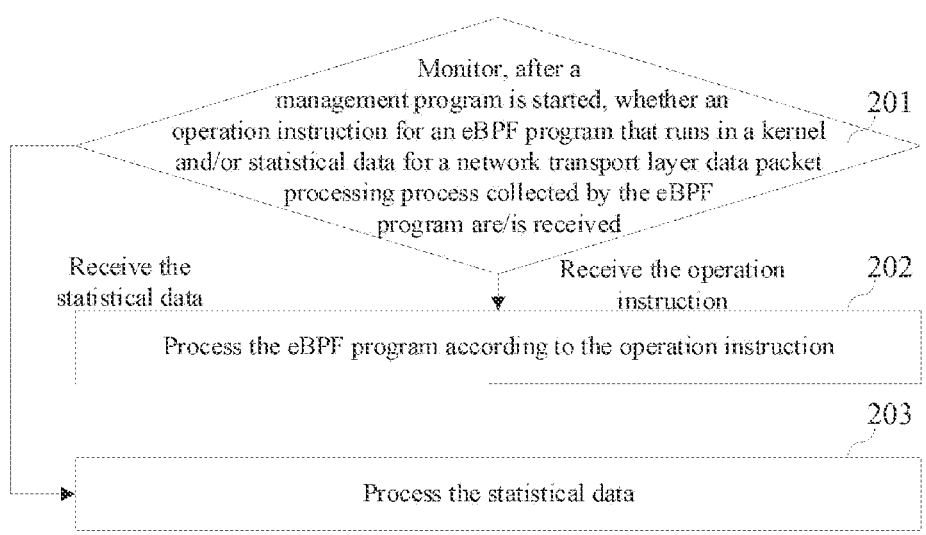

NETWORK TRANSPORT LAYER DATA PROCESSING METHOD, AND DEVICE AND STORAGE MEDIUM

CROSS-REFERENCE TO RELATED APPLICATION

The present application is proposed based on and claims priority to the Chinese patent application No. 202110655627.0 filed on Jun. 11, 2021, the entire contents of which are incorporated herein by reference.

TECHNICAL FIELD

Embodiments of the present application relate to the field of communications, in particular to a network transport layer data processing method and device, and a storage medium.

BACKGROUND

Currently, with the increasingly severe network security environment, network transport layer communication encryption and other security protection measures for inter system processes have become increasingly important. Linux, as a mainstream commercial product operating system in the industry, provides multiple built-in network transport layer encryption protocols and related implementations. At present, the most common network transport layer encryption processing methods or mechanisms include Internet protocol security (IPSec) and transport layer security (TLS). As shown in FIG. 1, in practical applications, the IPSec works on a network layer, located in a third layer, of an open system interconnection reference model (OSI model), and protects all IP-based communications by encrypting and authenticating IP protocol packets; the TLS, on the other hand, works on a transport layer, located in a fourth layer, of the OSI model, generally provides data security and integrity protection for upper layer applications based on a reliable transport layer protocol such as a connection-oriented transmission control protocol (TCP) and a connectionless user datagram protocol (UDP), and specifically creates a secure transmission connection/tunnel between two application programs by using a client-server model to prevent eavesdropping or tampering of interactive data.

Although the encryption processing methods or mechanisms above can achieve data encryption or decryption processing in a kernel, for the IPSec-based mode, in practical applications, a system administrator needs to modify network configuration or connection topology of the system, such as creating a new virtual network device, modifying a global routing table, which has invasive configuration requirements for the system's operating environment; and for the TLS-based mode, in practical applications, the application program needs to actively initiate and participate in an establishment process of transmission connection/tunnel, relevant configuration parameters and sensitive data, such as a digital certificate, generally also need to be maintained by the application program itself, which has invasive configuration requirements for an experience program itself.

That is to say, traditional network transport layer encryption processing methods are opaque to the system environment or the upper layer application. They require the system environment or the upper layer application to change their own status and participate in an actual encryption and decryption process. This kind of opacity brings additional deployment, configuration, operation-maintenance, and development burdens, as well as additional risks, for example, any incorrect configuration or implementation may result in data protection failure or has adverse effects on the system environment, thereby affecting other applications.

SUMMARY

An embodiment of the present application provides a network transport layer data processing method, applied to an extended Berkeley packet filter (eBPF) program that runs in a kernel. The network transport layer data processing method includes: acquiring a network transport layer data packet that needs to be distributed; parsing the network transport layer data packet, and determining a network transport layer data processing mode that needs to be performed on the network transport layer data packet; and processing the network transport layer data packet according to the network transport layer data processing mode.

An embodiment of the present application further provides a network transport layer data processing method, comprise applied to a management program that runs on a user plane. The network transport layer data processing method includes: monitoring, after the management program is started, whether an operation instruction for an eBPF program that runs in a kernel and/or statistical data for a network transport layer data packet processing process collected by the eBPF program are/is received; processing the eBPF program according to the operation instruction if the operation instruction for the eBPF program is received; and processing the statistical data if the statistical data for the network transport layer data packet processing process collected by the eBPF program is received.

An embodiment of the present application further provides a network transport layer data processing device, including: a management program that runs on a user plane, an eBPF program that runs in a kernel, at least one processor, and a memory, in communication connection with the at least one processor, wherein the management program is used for loading the eBPF program into the kernel of an environment located, such that the eBPF program runs in the kernel, the memory stores instructions executable by the at least one processor, and the instructions are executed by the at least one processor, so as to enable the at least one processor to execute any of the network transport layer data processing methods described above.

An embodiment of the present application further provides a computer-readable storage medium, storing a computer program. The computer program, when executed by a processor, implements any of the network transport layer data processing methods described above.

BRIEF DESCRIPTION OF FIGURES

One or more embodiments are exemplarily illustrated by pictures in corresponding accompanying drawings, and these exemplary illustrations do not constitute a limitation to the embodiments.

FIG. 1 is a schematic diagram of a corresponding relation between a traditional IPSec protocol, a TLS protocol, and an OSI model.

FIG. 2 is a schematic flowchart of a network transport layer data processing method applied to a management program provided by an embodiment of the present application.

DETAILED DESCRIPTION

Figure 3:
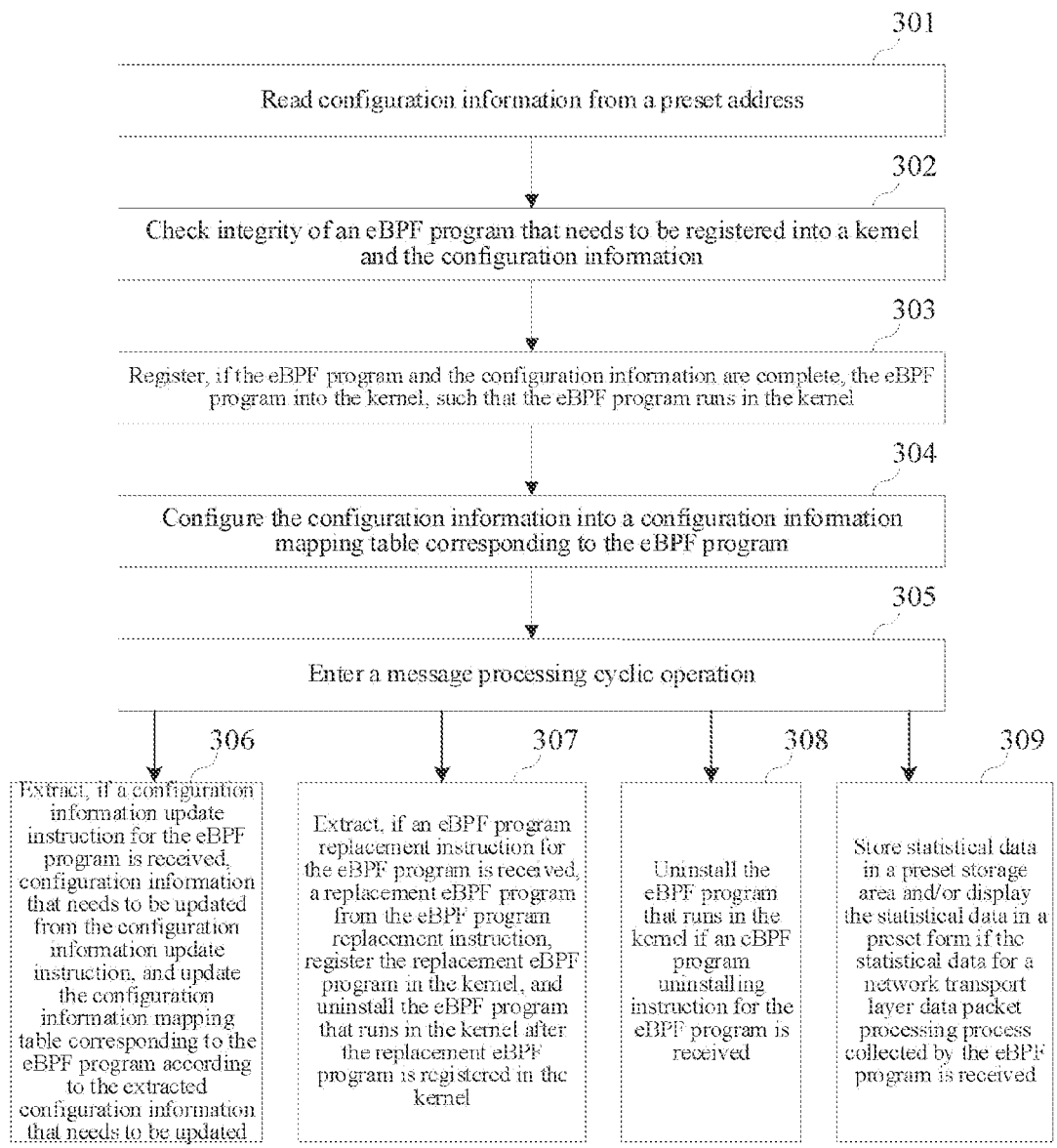
FIG. 3 is another schematic flowchart of a network transport layer data processing method applied to a management program provided by an embodiment of the present application.

A term "and/or" in the embodiments of the present application describes an association relationship of an association object, and represents that there may be three kinds of relationships, for example, A and/or B, may represent: A exists alone, A and B exist at the same time, and B exists alone. A character "/" generally represents that the previous and next association objects are in an "or" relationship.

A term "a plurality of" in the embodiments of the present application refers to two or more than two, and other quantifiers are similar.

In order to make the objective, technical solutions and advantages of embodiments of the present application clearer, all embodiments of the present application will be described below in detail with reference to accompanying drawings. However, the ordinarily skilled in the art can understand that in various embodiments of the present application, many technical details have been proposed to enable readers to better understand the present application. However, even without these technical details and various changes and modifications based on the following embodiments, the technical solution required for protection in the present application can still be achieved. The division of the following embodiments is for convenience in description and should not constitute any limitations on the specific implementations of the present application. All the embodiments can be combined and referenced with each other without contradiction.

According to a network transport layer data processing method and device, and a storage medium provided in the embodiments of the present application, by loading and running a management program that can manage an eBPF program on a user plane, and then using the management program to pre-register the eBPF program into a kernel, the eBPF program intercepts a network transport layer data packet that needs to be distributed by the kernel, such as a network transport layer data packet sent out and a network transport layer data packet received, and determines a network transport layer data processing mode for the network transport layer data packet that needs to be distributed, and finally, the eBPF program processes the currently intercepted network transport layer data packet according to the determined network transport layer data processing mode. The entire network transport layer data processing process can be completed in the eBPF program in the rewritten kernel, without the need for a system environment or an upper layer application to change its own status, and participate in an actual network transport layer data processing process, thereby achieving transparency to the system environment or the upper layer application, eliminating the need for additional deployment, configuration, operation-maintenance, and development costs, and ensuring good compatibility between the system environment and the upper layer application as well.

In addition, a network transport layer data processing solution provided by this embodiment not only performs encryption or decryption processing on the network transport layer data packet based solely on the eBPF program loaded in the kernel, but also sets up the eBPF program to cooperate with the upper layer application, such as an application program running on the user plane, so as to achieve joint encryption or decryption processing. Thus, based on actual business needs, while minimizing modifications to the upper layer application, the encryption/decryption modes of the upper layer application can be combined to further improve the security of the network transport layer data packet in a transport process.

In addition, security and overall performance of the network transport layer data processing solution provided by this embodiment are also ensured based on security and high performance of an eBPF technology itself.

Referring to FIG. 2, FIG. 2 is a flowchart of a network transport layer data processing method provided by an embodiment of the present application. In this embodiment, the method is mainly applied to a management program that runs on a user plane.

As shown in FIG. 2, the network transport layer data processing method provided in this embodiment includes the following steps:

step 201, after the management program is started, whether an operation instruction for an eBPF program that runs in a kernel and/or statistical data for a network transport layer data packet processing process collected by the eBPF program are/is received is monitored.

It should be noted that an original goal of the extended Berkeley packet filter (eBPF) program mentioned in this embodiment is to implement a brand-new packet filter to replace IPTABLE (a network firewall), but subsequent evolution has extended its functionality. Nowadays, the eBPF program is essentially a special code running in the kernel, a user may write functional codes within their specified limitations, and these codes are compiled into bytecodes and then loaded into a special virtual machine in the kernel for execution. Therefore, in order to manage the eBPF program according to actual service needs, this embodiment provides the management program that runs on the user plane, so that the user can manage the eBPF program that runs in in the kernel through the management program.

Based on the above discussion, in order to ensure the implementation of the network transport layer data processing method provided in this embodiment and the management of the eBPF program, the management program is not only responsible for loading or registering the eBPF program into the kernel, but also provides a user interaction interface.

In this embodiment, the above situation that the management program loads the eBPF program into the kernel, refers to load bytecodes that implement the corresponding functions of the eBPF program into a specified location of the kernel, so that when a network transport layer data packet needs to be distributed, such as being sent out or received, by the kernel, the network transport layer data packet that arrives at the kernel can be intercepted by the eBPF program loaded in the kernel, and furthermore, the eBPF program performs corresponding processing on the network transport layer data packet according to the corresponding functional interface/function.

Correspondingly, the user interaction interface provided by the management program is specifically used for receiving the operation instruction, made by the user, for the eBPF program that runs in the kernel.

In one example, the management program is further used for feeding back the statistical data, such as the number of successful encryption/decryption, and/or a running status and current configuration parameters of the eBPF program and other information, generated in a process of processing the network transport layer data packet and fed back by the eBPF program to the user through the user interaction interface, so that the user performs subsequent operations according to the current running condition of the eBPF program.

From the above description, it can be seen that after the management program is started, specifically, whether there are currently operation instructions for the eBPF program that runs in the kernel is determined by monitoring the user interaction interface, and whether the statistical data for the network transport layer data packet processing process collected by the eBPF program are received is determined by monitoring the interface that interacts with the eBPF program that runs in the kernel, such as a system call function/interface (syscall).

Correspondingly, if it is monitored that the operation instruction for the eBPF program that runs in the kernel is received, step 202 is performed; and if it is monitored that the network transport layer data packet output by the eBPF program that runs in the kernel is received, step 203 is performed.

In addition, it should be understood that in one example, if the management program receives current status information fed back by the eBPF program that runs in the kernel, such as the number of successfully decrypted network transport layer data packets, the number of successfully encrypted network transport layer data packets, and encryption-decryption conditions and rules based on which the eBPF program currently performs encryption and decryption, the management program may store and/or display the received information above in a preset form based on pre-configured service needs, or further provide feedback to the user through the user interaction interface.

Step 202, the eBPF program is processed according to the operation instruction.

In one example, the operation instruction for the eBPF program that runs in the kernel received by the management program through the user interaction interface is divided into three types: the operation instruction being a configuration information update instruction, or an eBPF program replacement instruction, or an eBPF program uninstallation instruction.

Correspondingly, there are differences in the processing of the eBPF program that has already been running in the kernel by the management program for the three different operation instructions above, specifically as follows:

(1) when the operation instruction is the configuration information update instruction,
  the specific processing for the eBPF program that has already been running in the kernel is as follows:
  firstly, configuration information that needs to be updated is extracted from the configuration information update instruction.

It may be understood that the configuration information mentioned in this embodiment includes any one or more of encryption-decryption conditions, encryption rules, and decryption rules.

The encryption-decryption conditions mentioned above are specifically that corresponding quadruple (a source port number, a destination port number, a source IP address, and a destination IP address) network transport layer data packets need to be encrypted or decrypted by using which kind of pre-agreed network transport layer protocols.

Correspondingly, the encryption rules mentioned above at least include a specific encryption algorithm used to perform encryption processing on the network transport layer data packet that needs to be subjected to encryption processing.

In this embodiment, if the specified encryption algorithm requires a secret key, the encryption rules further need to include the secret key required for encryption using the specified encryption algorithm.

Correspondingly, the decryption rules mentioned above at least include a specific decryption algorithm used to perform decryption processing on the network transport layer data packet that needs to be subjected to decryption processing.

In this embodiment, if the specified decryption algorithm requires a secret key, the decryption rules further need to include the secret key required for decryption using the specified decryption algorithm.

In addition, it should be understood that encryption processing and decryption processing usually occur in pairs, so relevant configuration information about encryption processing of a sender of the network transport layer data packets, such as the eBPF program running in the kernel in a node A, needs to be cooperated with relevant configuration information about decryption processing of a receiver of the network transport layer data packets, such as the eBPF program running in the kernel in a node B.

Then, a configuration information mapping table corresponding to the eBPF program that has been already running in the kernel is updated according to the extracted configuration information that needs to be updated.

The configuration information mapping table mentioned in this embodiment refers to a BPF MAP involved in an eBPF technology. In specific applications, a corresponding BPF MAP may be designed for different eBPF programs that can run in the kernel respectively, or a global BPF MAP can also be designed. All the eBPF programs that can run in the kernel can share a common BPF MAP. However, regardless of the mode, when designing the BPF MAP in advance based on the service needs, it is necessary to define the required parameters such as encryption and decryption of the eBPF program into the BPF MAP.

Correspondingly, based on the designed BPF MAP, when managing the eBPF program that runs in the kernel, such as modifying the configuration information, the management program only needs to update the configuration information that needs to be modified into the BPF MAP. After being activated by the kernel, the eBPF program will actively search for the required configuration information in the BPF MAP and then take corresponding actions according to the found configuration information.

That is to say, the BFP MAP is essentially a switching/communication mechanism provided by the kernel. Based on the BPF MAP, the management program that runs on the user plane can interact with the eBPF program that runs in the kernel.

(2) When the operation instruction is the eBPF program replacement instruction, the specific processing for the eBPF program that has already been running in the kernel is as follows:

Firstly, a replacement eBPF program is extracted from the eBPF program replacement instruction.

Then, the replacement eBPF program is registered in the kernel, and after registering the replacement eBPF program in the kernel, the eBPF program that runs in the kernel is uninstalled.

(3) When the operation instruction is the eBPF program uninstallation instruction, the specific processing for the eBPF program that has already been running in the kernel is: uninstalling the eBPF program that runs in the kernel.

Step 203, the statistical data are processed.

In one example, when the management program receives the statistical data provided by the eBPF program and collected during performing of encryption/decryption processing on the network transport layer data packets, such as the number of successful encryption or the number of successful decryption, the processing of the received statistical data may be to store the statistical data in a preset storage area and/or display in a preset form.

In addition, it is worth mentioning that in practical applications, the management program will exit a current message processing operation and stop executing the network transport layer data processing method provided by this embodiment after receiving the eBPF program uninstallation instruction and uninstalling the eBPF program, and the management process will automatically enter the next message processing in other cases, such as after completing the processing of the eBPF program that has already been running in the kernel according to the configuration parameter modifying instruction or the eBPF program replacement instruction, after or processing the statistical data.

Through the above description, it is not difficult to find that according to the network transport layer data processing method provided by this embodiment, by deploying on the user plane and starting the management program, the management program loads the eBPF program that can perform encryption-decryption processing into the kernel, monitors the feedback of the eBPF program that runs in the kernel and the operation instruction made by the user, and further makes the corresponding result directly on the user plane according to the monitored results or manages the eBPF program that runs in the kernel to achieve dynamic management of the eBPF program. Due to the fact that there is no need for a system environment or an upper layer application to change their own status and participate in the actual network transport layer data processing process in the entire process, encryption-decryption processing of network transport layer data can be achieved without any changes to the system environment or the upper layer application.

In addition, due to the direct management of the eBPF program that runs in the kernel by the management program, it is possible to achieve operations such as activation, deactivation, and change of the configuration information for the eBPF program that performs encryption-decryption processing without being aware by the system environment or the upper layer application, so as to dynamically adjust the data that needs to be transported. That is, the network transport layer data packet is subjected to encryption-decryption processing, so that the network transport layer data processing can better meet the actual changing service needs.

Based on this, the network transport layer data processing method provided by this embodiment really achieves transparency to the system environment or the upper layer application, eliminates the need for additional deployment, configuration, operation-maintenance, and development costs, and ensures good compatibility between the system environment and the upper layer application as well.

In addition, security and overall performance of the network transport layer data processing solution provided by this embodiment are also ensured based on security and high performance of the eBPF technology itself.

In addition, in one example, if absolute transparency is not pursued, or if there are special data protection requirements, the eBPF program may also cooperate with the upper layer application to complete data encryption or protection. For example, the upper layer application may intentionally send a data packet with illegal content. If the environment of the receiver has deployed the corresponding eBPF program (with correct parameter configuration at the same time), the eBPF program may fix illegal data before a receiver kernel sees the data, and then hand the data over to the kernel for processing, so that a receiver application can read the information correctly. If the receiver environment does not deploy the corresponding eBPF program (or the parameter configuration is incorrect), the receiver kernel (as well as malicious intermediaries who may be listening on a transmission line) will consider the data packet illegal and discard it, thus protecting the security of the data.

For this kind of joint encryption mode, if a node, such as the node A, is encrypted through the upper layer application, then the node A, which only sends the network transport layer data packet out, may not deploy the management program on the user plane and does not load the eBPF program in the kernel.

Correspondingly, the node B, which receives the network transport layer data packet encrypted by the node A through the upper layer application, needs to deploy the management program on the user plane and records the eBPF program in the kernel so as to cooperatively achieve the processing of the network transport layer data packet.

Referring to FIG. 3, FIG. 3 is another flowchart of a network transport layer data processing method provided by an embodiment of the present application. In this embodiment, the method is mainly applied to a management program that runs on a user plane.

In this embodiment, a specific operation of loading an eBPF program to a kernel by the management program is introduced. As shown in FIG. 3, the network transport layer data processing method provided in this embodiment includes the following steps: step 301, configuration information is read from a preset address.

In this embodiment, in order to ensure that when the kernel has network transport layer data that need to be distributed, whether it is inward, namely, network transport layer data packets received by the kernel from other nodes, or it is outward, namely, network transport layer data packets needing to be sent by the kernel to other nodes, the data packets can be intercepted by the eBPF program that runs in the kernel when it reaches the kernel, and the eBPF program performs corresponding network transport layer data processing, such as encryption processing or decryption processing, on the intercepted network transport layer data packets, so as to ensure that the eBPF program has already been running in the kernel. Therefore, when the network transport layer data processing method provided by this embodiment is first executed, after the management program is deployed to the user plane and started, the management program needs to first read the configuration information from a preset address, such as from a certain configuration information file stored on the user plane.

In addition, in this embodiment, the configuration information read by the management program from the preset address also includes any one or more of encryption-decryption conditions, encryption rules, and decryption rules.

Step 302, integrity of the eBPF program that needs to be registered into the kernel and the configuration information is checked.

In this embodiment, in order to ensure the performance and security of processing the network transport layer data packet based on the eBPF program registered into the kernel, the management program needs to check the integrity of the eBPF program and the configuration information before registering the pre-designed eBPF program into the kernel and configuring the read configuration information to the configuration information mapping table corresponding to the eBPF program.

Step 303, if the eBPF program and the configuration information are complete, the eBPF program is registered into the kernel, such that the eBPF program runs in the kernel.

Specifically, the management program loads bytecodes of the eBPF program into the kernel of an environment located, and then performs data exchange with the eBPF program through a system call function/interface (syscall) after loading the eBPF program into the kernel.

In addition, the management program also provides a management and query interface outward, such as a user interaction interface, to perform corresponding processing on the eBPF program that runs in the kernel according to an externally input operation instruction.

Step 304, the configuration information is configured into the configuration information mapping table corresponding to the eBPF program.

In this embodiment, the configuration information mapping table mentioned in this embodiment refers to a BPF MAP involved in an eBPF technology. In practical applications, the eBPF program and the management program provided in this embodiment may perform interaction of configuration data or statistical data collected during running through one or more BPF MAPs.

It should be understood that the above examples are only listed for a better understanding of the technical solution of this embodiment and are not the only limitations to this embodiment.

Step 305, a message processing cyclic operation is performed.

In this embodiment, entering the message processing cyclic operation mentioned above refers to pre-constructing a message queue. Each time a message that needs to be processed is monitored, such as an operation instruction for the eBPF program and/or when the eBPF program writes statistical data collected in the network transport layer data packet processing process in the BPF MAP, the received message that needs to be processed is first added to the message queue, and then the information that needs to be processed is sequentially read from the message queue, and according to the specific type of the currently read information that needs to be processed, any step from step 306 to step 309 is performed and the corresponding operation is executed.

Step 306, if the configuration information update instruction for the eBPF program is received, configuration information that needs to be updated is extracted from the configuration information update instruction, and the configuration information mapping table corresponding to the eBPF program is updated according to the extracted configuration information that needs to be updated.

Step 307, if the eBPF program replacement instruction for the eBPF program is received, a replacement eBPF program is extracted from the eBPF program replacement instruction, the replacement eBPF program is registered in the kernel, and the eBPF program that runs in the kernel is uninstalled after the replacement eBPF program is registered in the kernel.

Step 308, the eBPF program that runs in the kernel is uninstalled if the eBPF program uninstalling instruction for the eBPF program is received.

Step 309, the statistical data are stored in a preset storage area and/or displayed in a preset form if the statistical data for the network transport layer data packet processing process collected by the eBPF program is received.

It is not difficult to find that step 306 to step 307 in this embodiment are roughly the same as the several specific processing modes given in step 202 and step 203 in the embodiment shown in FIG. 2, and will not be repeated here.

Figure 4:
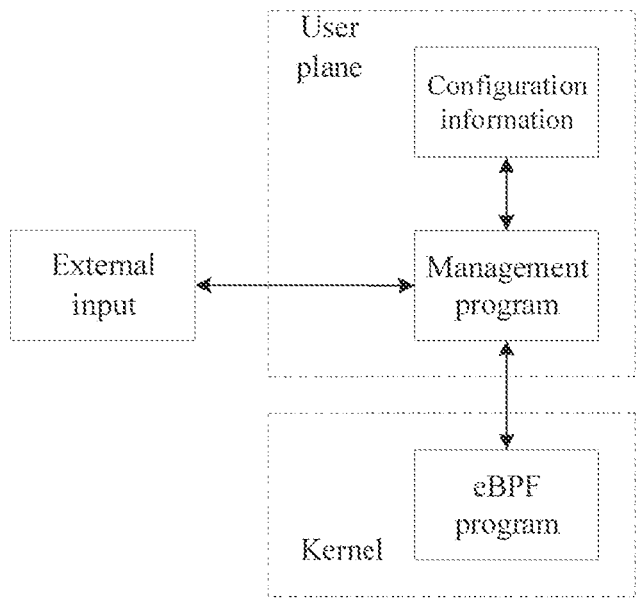
FIG. 4 is a schematic diagram of interaction between a management program and an eBPF program involved in a network transport layer data processing method shown in FIG. 2 or FIG. 3.

In addition, interaction among the management program, the configuration information that needs to be read, the eBPF program, and an external input involved in this embodiment is specifically shown in FIG. 4, and will not be repeated here.

Therefore, the network transport layer data processing method provided in this embodiment uses the management program that runs on the user plane to load the eBPF program into the kernel before processing the network transport layer data, and performs configuration management on the eBPF program. For example, the configuration information used in the encryption-decryption processing of the eBPF program is configured to the configuration information mapping table, so that when there is the network transport layer data packet that needs to be distributed by the kernel, the eBPF program can perform corresponding encryption processing and decryption processing.

Figure 5:
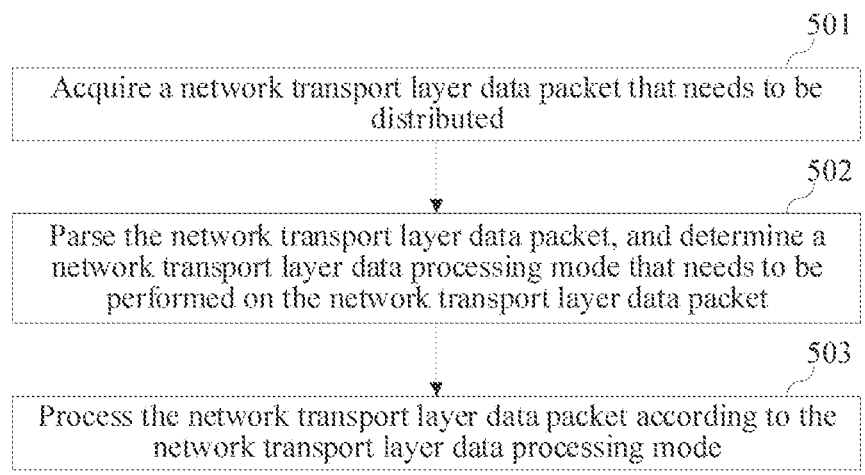
FIG. 5 is a schematic flowchart of a network transport layer data processing method applied to an eBPF program provided by an embodiment of the present application.

Referring to FIG. 5, FIG. 5 is a flowchart of a network transport layer data processing method provided by an embodiment of the present application. In this embodiment, the method is mainly applied to an eBPF program that runs in a kernel.

It should be noted that the network transport layer data processing method mentioned in this embodiment specifically refers to encryption processing or decryption processing of a network transport layer data packet that needs to be distributed by the kernel by the eBPF program that runs in the kernel.

As shown in FIG. 5, the network transport layer data processing method provided in this embodiment includes the following steps:

step 501, a network transport layer data packet that needs to be distributed is acquired.

It can be understood that the network transport layer data packet that needs to be distributed in this embodiment specifically refers to that the kernel needs to distribute the received network transport layer data packet to an upper layer application of this node, such as an application program that runs on the user plane, that is, the network transport layer data packet that needs to be distributed comes from other nodes.

In addition, in one example, the network transport layer data packet that needs to be distributed can also be distributed by the kernel to other nodes, that is, the network transport layer data packet that needs to be distributed needs to be sent by the kernel to other nodes.

In addition, it is worth mentioning that in practical applications, the eBPF program loaded into the kernel is not always in a running status or an activated status, is triggered by the kernel only when the network transport layer data packet that needs to be distributed arrives at the kernel, and then executes the network transport layer data processing method provided in this embodiment.

Correspondingly, the above acquired network transport layer data packet that needs to be distributed is essentially transported to the eBPF program after the kernel triggers the eBPF program.

Step 502, the network transport layer data packet is parsed, and a network transport layer data processing mode that needs to be performed on the network transport layer data packet is determined.

In this embodiment, a protocol header of the network transport layer data packet usually carries information such as a protocol and quadruple used to transport the network transport layer data packet. Therefore, when determining the network transport layer data processing mode that needs to be performed on the network transport layer data packet, the protocol header of the network transport layer data packet is extracted by parsing the network transport layer data packet, and then whether the network transport layer data packet needs to be encrypted or decrypted is judged according to the protocol header and pre-configured encryption-decryption conditions.

Correspondingly, if it is determined through judgment that the network transport layer data packet needs to be encrypted, the network transport layer data processing mode that needs to be performed on the network transport layer data is determined to be an encryption processing mode; and if it is determined through judgment that the network transport layer data packet needs to be decrypted, the network transport layer data processing mode that needs to be performed on the network transport layer data is determined to be decryption processing.

It should be noted that the encryption-decryption conditions mentioned in this embodiment are specifically provided by a management program that runs on a user plane. In practical applications, the encryption-decryption conditions may be predetermined encryption or decryption of network transport layer data packets transported by which protocols.

Furthermore, the encryption-decryption conditions can further be specified for a specific port number (a source port number and/or a destination port number), and a specific IP address (a source IP address and/or a destination IP address).

It should be understood that the above examples are only listed for a better understanding of the technical solution of this embodiment and are not the only limitations to this embodiment.

In addition, it should be noted that in practical applications, before determining the network transport layer data processing mode that needs to be performed on the network transport layer data packet, whether the network transport layer data packet needs to be subjected to network transport layer data processing may be determined first. If not, it may be directly handed over to the kernel for a subsequent distribution operation. If yes, the network transport layer data processing mode that needs to be performed may be determined.

In addition, in this embodiment, the network transport layer data processing mode that is performed on the network transport layer data packet that needs to be distributed is roughly divided into encryption processing and decryption processing. In practical applications, encryption processing is usually performed on network transport layer data packets that need to be sent to other nodes, while decryption processing is performed on network transport layer data packets received from other nodes. Based on this, when determining the network transport layer data processing mode that needs to be performed on the network transport layer data packet, it can be specifically determined whether the current network data needs to be sent out or received first.

Correspondingly, if it is received, the specific mode is to judge whether the network transport layer data packet needs to be decrypted; and if it needs to be sent out, the specific mode is to judge whether the network transport layer data packet needs to be encrypted.

Step 503, the network transport layer data packet is processed according to the network transport layer data processing mode.

In this embodiment, when the determined network transport layer data processing mode is an encryption processing mode, the processing of the network transport layer data packet is specifically as follows:

first, a target encryption rule is selected from pre-configured encryption rules.

In this embodiment, the pre-configured encryption rules mentioned above are also provided by the management program that runs on the user plane. Specifically, the management program reads configuration information including the encryption rules from a preset address, and then configures the read configuration information into the configuration information mapping table corresponding to the eBPF program. Therefore, the operation of selecting the target encryption rule mentioned above is specifically to select an encryption rule suitable for the current network transport layer data packet that needs to be encrypted from the configuration information mapping table.

It should be noted that in practical applications, the encryption rules at least need to include a specific encryption algorithm.

For those that require a secret key, the encryption rules further need to include an encryption secret key, which can be understood as encryption parameters.

In addition, in practical applications, the selection of the target encryption rule suitable for the current network transport layer data packet that needs to be encrypted can be determined according to content of a protocol header of the current network transport layer data packet that needs to be encrypted.

For example, by pre-specifying the use of a certain protocol, a certain specific port number, or a specific encryption mode and key corresponding to a certain IP address, when selecting the target encryption rule, the protocol header of the network transport layer data packet that more needs to be encrypted can quickly and accurately select an encryption rule suitable for the network transport layer data packet.

Furthermore, it is worth mentioning that in one example, it may also be that all the network transport layer data packets that need to be encrypted use the same encryption rule.

Next, encryption processing is performed on a load part of the network transport layer data packet according to the target encryption rule.

Then, the protocol header is updated according to the encrypted load part to obtain the encrypted network transport layer data packet.

Due to the difference between a length of the encrypted load part and a length of the load part before encryption after the encryption processing, in order to ensure that the encrypted network transport layer data packet is not mistaken for illegal data after being transported to other nodes due to the fact that length information recorded in the protocol header is inconsistent with the actually received length of the load part of the network transport layer data packet, after performing encryption processing on the load part of the network transport layer data packet according to the target encryption rule, the protocol header needs to be updated according to the encrypted load part to ensure that the finally obtained information recorded in the protocol header of the encrypted network transport layer data packet is consistent with the length of the encrypted load part.

Finally, the encrypted network transport layer data packet is handed over to the kernel, and the encrypted network transport layer data packet is distributed through the kernel.

As a result, encryption processing of network transport layer data that needs to be distributed is achieved.

Correspondingly, when the determined network transport layer data processing mode is the decryption processing mode, the processing mode of the network transport layer data packet is specifically: first, selecting the target decryption rule from the pre-configured decryption rules; then, performing decryption processing on the load part of the network transport layer data packet according to the target decryption rule; next, updating the protocol header according to the decrypted load part to obtain the decrypted network transport layer data packet; and finally, handing over the decrypted network transport layer data packet to the kernel, and distributing the decrypted network transport layer data packet through the kernel.

It can be understood that in order to ensure that the network transport layer data packet encrypted by the eBPF program can be decrypted by the eBPF program that runs in the kernel of an opposite node when arriving at a kernel of the opposite node, the decryption rule needs to correspond to the encryption rule to ensure that the encrypted network transport layer data packet can be decrypted, thereby restoring the original network transport layer data packet.

Therefore, according to the network transport layer data processing method provided by this embodiment, by loading and running the management program that can manage the eBPF program on the user plane, and then using the management program to pre-register the eBPF program into the kernel, the eBPF program intercepts the network transport layer data packet that needs to be distributed by the kernel, such as a network transport layer data packet sent out and a network transport layer data packet received, and determines the network transport layer data processing mode for the network transport layer data packet that needs to be distributed, and finally, the eBPF program processes the currently intercepted network transport layer data packet according to the determined network transport layer data processing mode. The entire network transport layer data processing process can be completed in the eBPF program in the rewritten kernel, without the need for a system environment or an upper layer application to change its own status, and participate in an actual network transport layer data processing process, thereby achieving transparency to the system environment or the upper layer application, eliminating the need for additional deployment, configuration, operation-maintenance, and development costs, and ensuring good compatibility between the system environment and the upper layer application as well.

In addition, in one example, if absolute transparency is not pursued, or if there are special data protection requirements, the eBPF program may also cooperate with the upper layer application to complete data encryption or protection. For example, the upper layer application may intentionally send a data packet with illegal content. If the environment of the receiver has deployed the corresponding eBPF program (with correct parameter configuration at the same time), the eBPF program may fix the illegal data before a receiver kernel sees the data, and then hand the data over to the kernel for processing, so that a receiver application can read the information correctly. If the receiver environment does not deploy the corresponding eBPF program (or the parameter configuration is incorrect), the receiver kernel (as well as malicious intermediaries who may be listening on a transmission line) will consider the data packet illegal and discard it, thus protecting the security of the data.

For this kind of joint encryption mode, if a node, such as a node A, is encrypted through the upper layer application, then the node A, which only sends the network transport layer data packet out, may not deploy the management program on the user plane and does not load the eBPF program in the kernel.

Correspondingly, a node B, which receives the network transport layer data packet encrypted by the node A through the upper layer application, needs to deploy the management program on the user plane and records the eBPF program in the kernel so as to cooperatively achieve the processing of the network transport layer data packet.

In addition, security and overall performance of the network transport layer data processing solution provided by this embodiment are also ensured based on security and high performance of the eBPF technology itself.

Furthermore, it is worth mentioning that the eBPF program is loaded into the kernel by the management program that runs on the user plane, and the management program can manage the eBPF program, therefore, in practical applications, if the eBPF program that runs in the kernel receives a configuration information update instruction issued by the management program on the user plane, the pre-configured configuration information is updated according to the configuration information update instruction, that is, the configuration information configured in the configuration information mapping table may be specifically any one or more of the encryption-decryption conditions, the encryption rules, and the decryption rules. As a result, the eBPF program that runs in the kernel is dynamically updated, so that the eBPF program that runs in the kernel can better adapt to actual network transport layer data processing needs.

Figure 6:
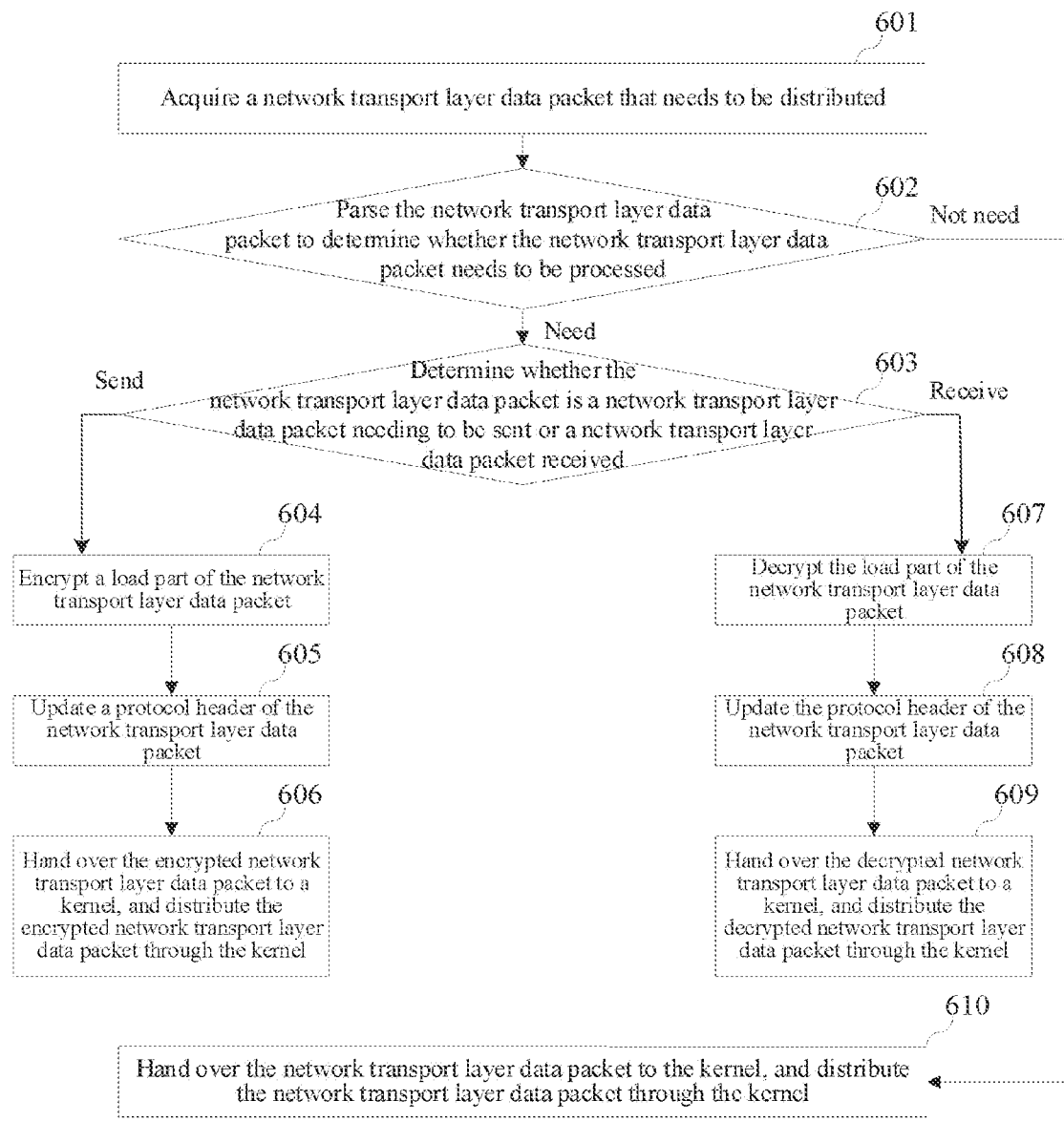
FIG. 6 is another schematic flowchart of a network transport layer data processing method applied to an eBPF program provided by an embodiment of the present application.

Referring to FIG. 6, FIG. 6 is a flowchart of a network transport layer data processing method provided by an embodiment of the present application. In this embodiment, the method is mainly applied to an eBPF program that runs in a kernel.

As shown in FIG. 6, the network transport layer data processing method provided in this embodiment includes the following steps:

step 601, a network transport layer data packet that needs to be distributed is acquired.

It is not difficult to find that step 601 in this embodiment is roughly the same as step 501 in the embodiment shown in FIG. 5, and will not be repeated here.

Step 602, the network transport layer data packet is parsed to determine whether the network transport layer data packet needs to be processed.

In this embodiment, not every network transport layer data packet that needs to be distributed by the kernel needs to be encrypted or decrypted, such as a response to information or request sent by an opposite node only made by the opposite node. Therefore, before determining a network transport layer data processing mode for the network transport layer data packet to be distributed, whether the current network transport layer data packet needing to be distributed needs to be encrypted or decrypted may be determined according to identification information carried in a protocol header of the parsed network transport layer data packet.

Correspondingly, if it is determined that the network transport layer data packet needs to be processed, step 603 is performed to determine the specific network transport layer data processing mode that needs to be performed by the network transport layer data packet.

On the contrary, if it is determined that the network transport layer data packet does not need to be processed, step 610 is directly performed, that is, the intercepted network transport layer data packet is directly handed over to the kernel for distribution by the kernel.

Step 603, whether the network transport layer data packet is a network transport layer data packet needing to be sent or a network transport layer data packet received is determined.

According to the above discussion, it can be seen that for the network transport layer data packet that needs to be subjected to network transport layer data processing, when the network transport layer data packet is the network transport layer data packet that needs to be sent by the kernel to other nodes, the network transport layer data processing mode that needs to be performed is an encryption processing mode.

Correspondingly, when the network transport layer data packet that needs to be subjected to network transport layer data processing needs to be fed back by the kernel to the upper layer application, namely, an application program located in a user plane, or when the network transport layer data packet is a network transport layer data packet received by the kernel from other nodes, the network transport layer data processing mode that needs to be performed is a decryption processing mode.

Based on this, the specific processing mode of the network transport layer data packet that needs to be processed can be quickly determined only by determining whether the network transport layer data packet is the network transport layer data packet needing to be sent or the network transport layer data packet received.

Correspondingly, step 603 is performed if it is determined that the network transport layer data packet is the network transport layer data packet needing to be sent. On the contrary, step 607 is performed if it is determined that the network transport layer data packet is the network transport layer data packet received.

Step 604, a load part of the network transport layer data packet is encrypted.

Step 605, the protocol header of the network transport layer data packet is updated.

Step 606, the encrypted network transport layer data packet is handed over to the kernel, and the encrypted network transport layer data packet is distributed through the kernel.

Step 607, the load part of the network transport layer data packet is decrypted.

Step 608, the protocol header of the network transport layer data packet is updated.

Step 609, the decrypted network transport layer data packet is handed over to the kernel, and the decrypted network transport layer data packet is distributed through the kernel.

Step 610, the network transport layer data packet is handed over to the kernel, and the network transport layer data packet is distributed through the kernel.

Therefore, the network transport layer data processing method provided by this embodiment better solves intrusion impact of a traditional network transport layer data transport encryption protocol on the system environment and the upper layer application during use through the use of the eBPF program, provides more flexible and powerful data transport encryption and protection functions, and meanwhile has better isolation and guarantee in terms of security.

In addition, it should be noted that the eBPF technology supports multiple program types, and different types of programs are suitable for different purposes. Currently, the most suitable type for implementing the transport encryption function is traffic control (TC). Therefore, the eBPF program mentioned in this embodiment for performing encryption processing or decryption processing on the network transport layer data packet is specifically a TC-type eBPF program. By loading the TC-type eBPF program in the kernel, a processing ingress and egress of a Linux kernel for the network transport layer data packet can be directly intercepted. Before the kernel receives or sends the network transport layer data packet, the TC program may directly access a memory buffer area for buffering an original network transport layer data packet, then acquire the network transport layer data packet needing to be processed from the memory buffer area according to a memory buffer area address corresponding to the original network transport layer data packet, and then perform corresponding network transport layer data processing operation on the acquired network transport layer data packet. After completing the corresponding network transport layer data processing operation, the data packet is then handed over to the kernel for distribution and processing.

Obviously, by utilizing the TC-type eBPF program, the specific implementation and configuration logic of data encryption and decryption can be integrated into a software and hardware unit, thereby completing encryption and decryption of the network transport layer data without any details being understood by the system environment and the upper layer application. Furthermore, the eBPF program, like the kernel, can be dynamically loaded/unloaded during running. Therefore, the network transport layer data processing method provided by this embodiment can activate/deactivate encryption and decryption functions during running, or dynamically replace an encryption algorithm and configuration data. At the same time, an operating system and the upper layer application can be unaware of these behavioral changes.

In addition, it should be noted that the TC-type eBPF program used in this embodiment is determined based on a current status of the eBPF technology. If other suitable types appear in the rapid evolution of the eBPF technology in the future, the method implemented in this embodiment can still be implemented. That is, in this embodiment, the use of the TC-type eBPF program for implementing network transport layer data processing is only a specific implementation, and does not constitute any limitations on the technical solution provided by this embodiment itself.

In addition, in one example, if absolute transparency is not pursued, or if there are special data protection requirements, the eBPF program may also cooperate with the upper layer application to complete data encryption or protection. For example, the upper layer application may intentionally send a data packet with illegal content. If the environment of a receiver has deployed the corresponding eBPF program (with correct parameter configuration at the same time), the eBPF program may fix the illegal data before a receiver kernel sees the data, and then hand the data over to the kernel for processing, so that a receiver application can read the information correctly. If the receiver environment does not deploy the corresponding eBPF program (or the parameter configuration is incorrect), the receiver kernel (as well as malicious intermediaries who may be listening on a transmission line) will consider the data packet illegal and discard it, thus protecting the security of the data.

Figure 7:
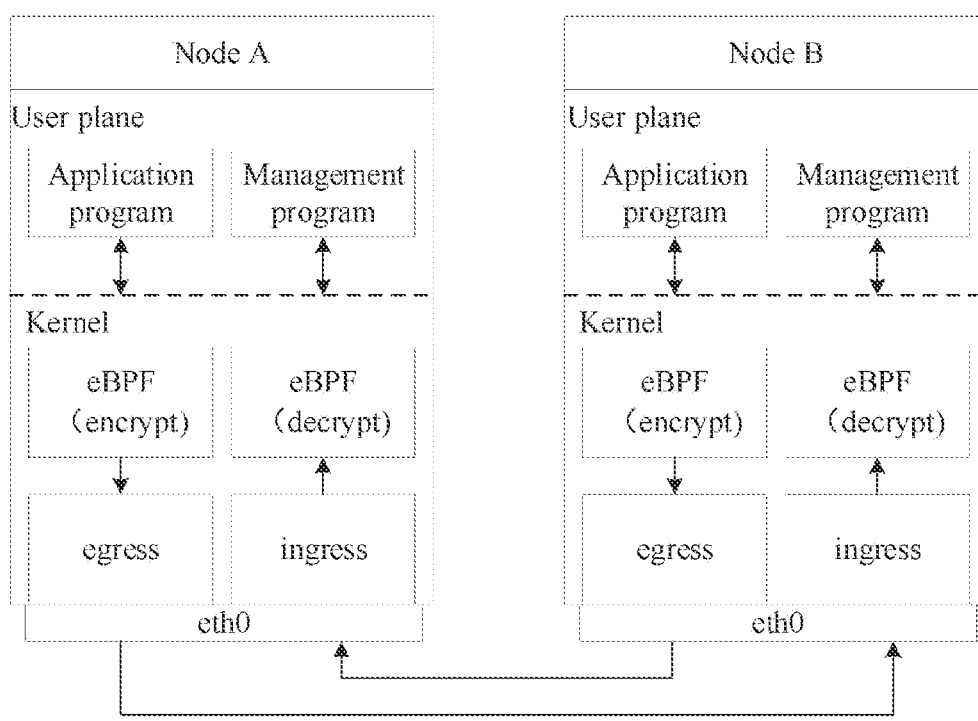
FIG. 7 is a schematic diagram of implementing fully-transparent transport encryption between a node A and a node B based on a network transport layer data processing method provided by an embodiment of the present application.
Figure 8:
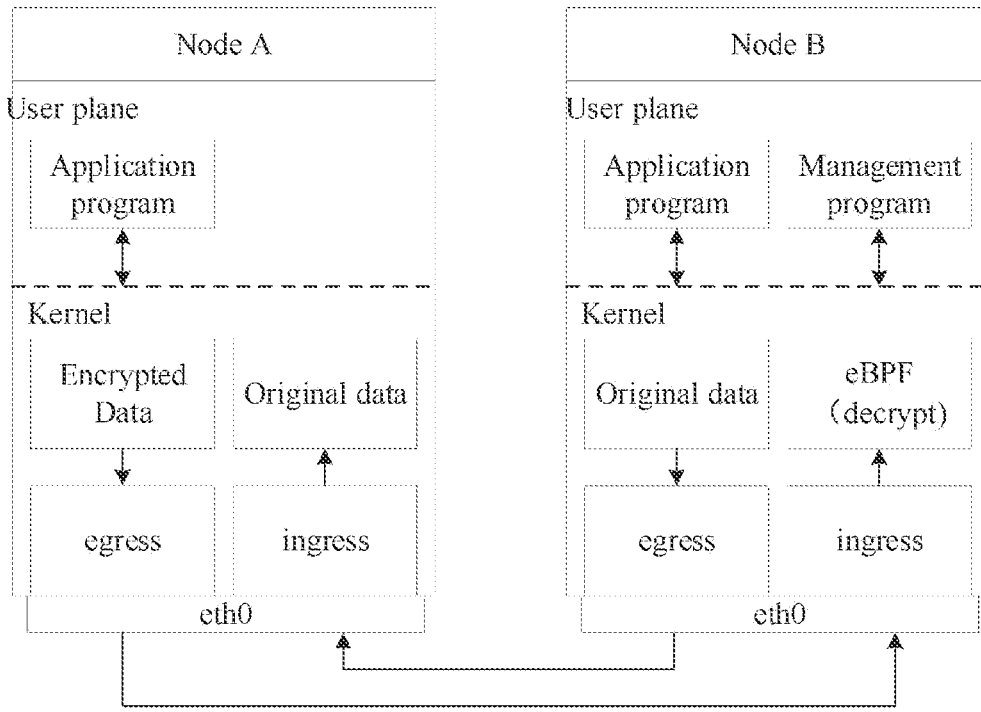
FIG. 8 is a schematic diagram of implementing joint encryption with an upper layer application program between a node A and a node B based on a network transport layer data processing method provided by an embodiment of the present application.

In addition, in order to better understand the network transport layer data processing method applied to the management program that runs on the user plane and the network transport layer data processing method applied to the eBPF program that runs in the kernel provided based on this embodiment, network transport layer data processing, specifically an encryption process and a decryption process, implemented based on the cooperation between the management program and the eBPF program is specifically illustrated below in combination with FIG. 7 and FIG. 8.

Firstly, it should be noted that in practical applications, both the receiver (hereinafter referred to as a data receiver) and a sender (hereinafter referred to as a data sender) of the network transport layer data packet must use a Linux system, and meanwhile, the kernel version must be greater than 4.3, with eBPF related functions enabled.

Furthermore, both data communication parties, namely the data sender and the data receiver, need to use a standard network transport layer protocol stack, such as IP, TCP/UDP communication.

In addition, it can be understood that in practical applications, the management program that runs on the user plane and the eBPF program that runs in the kernel can be packaged in a software package SDK, and distributed and deployed in a form of software, or packaged in portable hardware, and distributed and deployed in a form of hardware units.

In addition, network cards of some mainstream manufacturers on the current market already support direct loading and running of the eBPF program. This means that the specific network transport layer data processing work is no longer dependent on the kernel of the operating system, but is completed by a dedicated chip inside the network card. Therefore, for such devices, the eBPF program can be directly loaded into the device and run, with an only need of managing the management program that needs to be run on the user plane separately and establishing communication between the two.

Referring to FIG. 7, FIG. 7 is a schematic diagram of implementing fully-transparent transport encryption between a node A and a node B. That is, an application program (an upper layer application) located on the user plane does not participate in encryption and decryption, and the system environments and the upper layer applications of the node A and the node B are not aware of the entire transport encryption process.

For the convenience of subsequent description, it is first assumed that the upper layer application, namely, the application program and an encryption system (the management program+the eBPF program), comply with the following settings:

the upper layer application communicates with another far-end same application on a port 1080 using a TCP protocol, such as the node A and the node B in FIG. 7; network devices of the node A and the node B are both eth0; a file name of the eBPF program is eBPF.elf; a function responsible for encryption in the eBPF program is called encrypt; and a function responsible for decryption in the eBPF program is called decrypt.

The management program needs to run on the node A and the node B, and load the eBPF program (specifically loading an encryption function and a decryption function in the eBPF program) through the following command:

loading the encryption function in the eBPF program: tc filter add dev eth0 egress bpf da objeBPF.elf sec encrypt loading the decryption function in the eBPF program: tc filter add dev eth0 inressbpf da objeBPF.elf sec decrypt After executing the above two loading commands, both the kernel of the node A and the kernel of the node B will call the encrypt function in the previously mounted eBPF program when sending the network transport layer data packet (egress) to eth0 , and pass an original socket kernel buffer (skb for short) pointer to the function.

The processing flow of the encrypt function is specifically as follows:

(1) Ethernet protocol analysis (parsing and stripping an ethernet header) is performed on skb.

(2) Whether a load part of the network transport layer data packet is an IP protocol is determined. If not, the processing ends directly, that is, step (9) is performed.

(3) IP protocol analysis (parsing and stripping an IP header) is performed on the load part. If load protocol indication of the IP header is not TCP, the processing ends directly, and step (9) is performed.

(4) TCP protocol analysis (parsing and stripping a TCP header) is performed on the load part. Whether a destination port is 1080 is determined, if not, the processing ends directly, and step (9) is performed.

(5) A data load range (a start pointer and an end pointer) of the IP protocol is calculated.

(6) A stream encryption algorithm (Rivest Cipher 4, RC4) is used to encrypt the IP protocol load.

It may be understood that the above is only a specific encryption algorithm. In practical applications, those skilled in the art can choose the encryption algorithm as needed and send the selected encryption algorithm to the management program for configuration by the management program.

(7) Encrypted data are written back (using bpf_skb_store_bytes in a bpf helper function in the kernel), and the IP header (mainly a length and a check code, using bpf_13_csum_replace in the bpf helper function) is updated.

(8) The bpf helper function in the kernel: bpf_skb_adjust_room is called, and skb is updated.

(9) Processing ends (the kernel will continue to complete the sending work of the updated data).

As a result, the encryption processing of the network transport layer data packet by the eBPF program is completed.

Correspondingly, after executing the loading commands, both the kernel of the node A and the kernel of the node B will call the decrypt function in the previously mounted eBPF program when receiving the network transport layer data packet (ingress) from eth0, and pass an original data buffer (sk_buff, skb for short) pointer to the function.

The processing flow of the decrypt function is specifically as follows:

(1) Ethernet protocol analysis (parsing and stripping the ethernet header) is performed on skb.

(2) Whether the load part is the IP protocol is determined. If not, the processing ends directly, that is, step (9) is performed.

(3) IP protocol analysis (parsing and stripping the IP header) is performed. If load protocol indication of the IP header is not TCP, the processing ends directly, and step (9) is performed.

(4) TCP protocol analysis (parsing and stripping the TCP header) is performed on the load part. If a format is correct, it indicates that the data is not encrypted, the processing ends directly, and step (9) is performed.

(5) An RC4 algorithm is used for performing decryption processing on the IP load part.

It may be understood that since the above encryption process uses the RC4 algorithm, the decryption process also needs to use the RC4 algorithm.

(6) TCP protocol header check is performed on the decrypted data. If the data are illegal, for example, if a value of a certain field is not within a legal range, or if the destination port is not 1080, the processing ends directly, and step (9) is performed.

(7) Decrypted data are written back (using the bpf helper function: bpf_skb_store_bytes), and the IP header (mainly a length and a check code, using the bpf helper function: bpf_13_csum_replace) is updated.

(8) The bpf helper function in the kernel: bpf_skb_adjust_room is called, and skb is updated.

(9) Processing ends (the kernel will continue to complete the receiving work of the updated data).

As a result, the decryption processing of the network transport layer data packet by the eBPF program is completed.

In addition, it is worth mentioning that in practical applications, the encrypt function and the decrypt function further need to perform the following operations:

acquiring necessary parameters, such as RC4 encryption algorithm related parameters and TCP port number, passed by the management program from the specified configuration information mapping table (BPF MAP); and recording some running statistical data into the specified BPF MAP, such as the total number of encrypted packets/decrypted packets, and the number of times of successes/failures.

In addition, it is worth mentioning that in addition to loading the eBPF program during an initialization phase, the management program is further responsible for the following tasks: passing necessary parameters, such as the RC4 encryption algorithm related parameters and the TCP port number, to the encrypt function and the decrypt function through the BPF MAP; reading and summarizing the statistical data, such as the total number of encrypted packets/decrypted packets and the number of times of successes/failures, recorded by the encrypt function and decrypt function during running through the BPF MAP; and making, through a command line (or other forms such as Restful) interface, a user to manage and query the running parameters of the eBPF program, such as quadruple information (the port number, the address, etc.) and the running state, the number of successful encryption/decryption, and the number of illegal or legal data detected.

From the above description, it can be found that under the fully-transparent transport encryption mode, the upper layer application does not participate in the encryption-decryption process of a network transport layer. Therefore, it is completely unaware of algorithm, parameters, timing and other details used by a lower-layer transport encryption system, and does not consider encryption and decryption when sending and receiving network data, all of which are processed in a plaintext format. In this way, the upper layer application can achieve encryption and decryption of the network transport layer data without any operation or configuration modification, and the upper layer application is ignorant of the details of the encryption process. Even if it is attacked by an attacker, the attacker cannot understand the actual details of the encryption-decryption process, nor can it acquire key encryption-decryption sensitive data, such as a secret key. This not only solves the technical problems of additional deployment, configuration, operation-maintenance, and development burden, and the risk caused by traditional opaque transport encryption, but also ensures the security of the data content in the transported network transport layer data packet.

Referring to FIG. 8, FIG. 8 is a schematic diagram of implementing joint encryption with an upper layer application program between a node A and a node B. That is, the application program located on the user plane participates in the encryption processing or the decryption processing of network transport layer data packet that needs to be distributed by the eBPF program that runs in the kernel.

Specifically, in a cooperative transport encryption mode with the participation of the upper layer application, the upper layer application will cooperate with the encryption system to complete the encryption-decryption process of the transported data. There are many ways to cooperate, such as:

Mode 1: the application program is responsible for encrypting the sent data, and an opposite eBPF program is responsible for decrypting the received data.

Mode 2: the application program is responsible for decrypting the received data, and the opposite eBPF program is responsible for encrypting the sent data.

Mode 3: the application program is responsible for encryption and decryption of the sent data and the received data, the eBPF program is responsible for scrambling and descrambling the encrypted data when sending and receiving the data. That is, the eBPF program performs secondary processing on the encrypted data or the decrypted data of the upper layer application.

It should be noted that the goal of the different cooperation modes mentioned above is only one: the data encryption-decryption process can be completed normally only when both the upper layer application and the eBPF program exist. Missing any link will result in data being unable to be decrypted normally. This flexible and diverse joint encryption-decryption mechanism, although losing some transparency (the upper layer service needs to participate in the encryption-decryption process), effectively improves the overall security of data encryption.

As for the above mode 3, in practical applications, both the management program and the eBPF program need to be deployed in the node A and the node B, and the eBPF program supports calling of both encrypt function and the decrypt function. Its general implementation is similar to the description for FIG. 7, except that the application program on the user plane is added with encryption and decryption operations.

The following is a specific explanation of Mode 1 in conjunction with FIG. 8. The ideas of other joint encryption modes are similar, but the specific implementation actions and applicable scenarios are different.

For the mode 1 mentioned above, specifically, in the node A, the application program uses a preset encryption algorithm, such as an asymmetric encryption algorithm, to encrypt the data needing to be sent. In the node B, the management program is deployed on the user plane, and the eBPF program for decryption is loaded in the kernel. This method is particularly suitable for scenarios with the following features or requirements: an application at a data sending end is fully controlled (a code and configuration can be modified); a data transmission channel is untrustworthy and uncontrolled; an application at a data receiving end is not controlled (a code or configuration cannot be modified); a network configuration of an environment where the sending end and the receiving end are located cannot be modified or is not easy to modify; and encryption is only required for the sent data, and encryption is not required for response data sent back from a far end.

For the convenience of subsequent description, it is first assumed that the upper layer application and the encryption system comply with the following settings:

the upper layer application communicates with another far-end same application on the port 1080 using the TCP protocol, such as the node A and the node B in FIG. 8; network devices of the node A and the node B are both eth0; and the user plane of the node B runs the management program, the kernel of the node B runs the eBPF program, a file name of the eBPF program is eBPF.elf, the eBPF program is only responsible for decryption, and the function responsible for decryption is called decrypt.

For the data sending end, namely, the node A in FIG. 8, the upper layer application uses an asymmetric encryption algorithm (such as an X25519 elliptic curve encryption algorithm or similar other algorithms) and uses a public key to encrypt the TCP load data to be sent before sending it. At the same time, the node A does not need to reside the management program and does not need to load any eBPF program.

For the data receiving end, namely, the node B in FIG. 8, the management program needs to be resident on the user plane, and the eBPF program needs to be resident in the kernel. For the management program in the node B, the eBPF program needs to be loaded using the following command (specifically loading the decryption function in the eBPF program): loading the decryption function in the eBPF program: tc filter add dev eth0 inressbpf da objeBPF.elf sec decrypt.

Correspondingly, after executing the loading commands above, for example, when the kernel of the node B will call the decrypt function in the previously mounted eBPF program when receiving the network transport layer data packet (ingress) sent from the node A from eth0, and pass the skb pointer to the function.

The processing flow of the decrypt function is specifically as follows:

(1) Ethernet protocol analysis (parsing and stripping the ethernet header) is performed on skb.

(2) Whether the load part is the IP protocol is determined. If not, the processing ends directly, that is, step (8) is performed.

(3) IP protocol analysis (parsing and stripping the IP header) is performed. If load protocol indication of the IP header is not TCP, the processing ends directly, and step (8) is performed.

(4) TCP protocol analysis (parsing and stripping a TCP header) is performed on the load part. If the format is illegal or the destination port number is not equal to 1080, the processing ends directly, and step (8) is performed.

(5) An X25519 algorithm and a private key are used to decrypt the TCP load part.

It may be understood that the above is only a specific decryption algorithm. In practical applications, those skilled in the art can choose the encryption algorithm as needed and send the selected decryption algorithm to the management program for configuration by the management program.

In addition, it may be understood that the decryption method based on by the eBPF program for decryption needs to correspond to the encryption method used by the application in the node A.

(6) The decrypted data are written back (using: bpf_skb_store_bytes in the bpf helper function), and the TCP header and the IP header (mainly a length and a check code, using bpf_13_csum_replace and bpf_14_csum_replace in the bpf helper function) are updated.

(7) bpf_skb_adjust_room in the bpf helper function in the kernel is called, and skb is updated.

(8) Processing ends (the kernel will continue to complete the receiving work of the updated data).

Therefore, in the node B, the eBPF program in the kernel is used to decrypt the network transport layer data packet.

In addition, it is worth mentioning that the decrypt function further needs to execute the following operations: acquiring necessary parameters, such as X25519 encryption algorithm related parameters, a private key and a TCP port number, passed by the management program from the specified BPF MAP; and recording some running statistical data into the specified BPF MAP, such as the total number of encrypted packets/decrypted packets, and the number of times of successes/failures.

In addition, it is worth mentioning that in practical applications, in addition to loading the eBPF program during an initialization phase, the management program that runs in the user plane of the node B is further responsible for the following tasks: passing necessary parameters, such as the X25519 encryption algorithm related parameters, the private key and the TCP port number, to the decrypt function through the BPF MAP; reading and summarizing the statistical data, such as the total number of decrypted packets and the number of times of successes/failures, recorded by the decrypt function during running through the BPF MAP; and making, through a command line (or other forms such as Restful) interface, the user to manage and query the running parameters of the eBPF program and the running state.

As a result, joint encryption between the upper layer application and the eBPF program is achieved, further improving the security of the transported data while ensuring transparency as much as possible.

From the above description, it can be seen that the network transport layer data processing method provided by this embodiment can achieve network transport layer communication encryption without being aware by the system environment configuration and the upper layer application, and therefore has lower deployment costs and good compatibility with the environment and the application. At the same time, the encryption algorithm, parameters, and activation switches can be changed at any time during running. The upper layer application may also choose to cooperate with the system to implement a custom joint encryption protection mechanism, thus having good flexibility and expansion capability. Finally, due to the use of the eBPF technology, the method also ensures security and performance.

In addition, it should be understood that the step division of the above methods is only for the purpose of describing clearly, and can be merged into one step when implemented, or some steps can be split into multiple steps, which are all within the scope of protection of this patent as long as the same logical relationship is included. Adding irrelevant modifications or introducing irrelevant designs to the algorithms or the processes, but not changing the core design of the algorithms and processes, is within the scope of protection of this patent.

Figure 9:
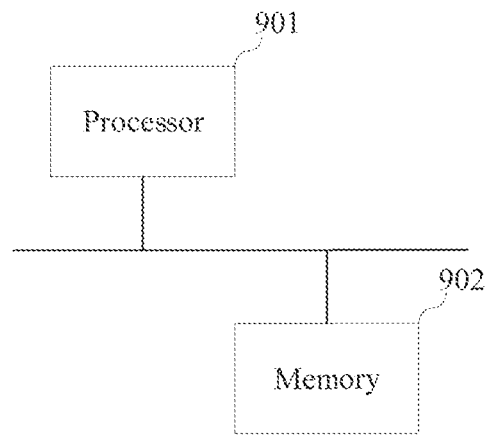
FIG. 9 is a schematic structural diagram of a network transport layer data processing device provided by an embodiment of the present application.

Referring to FIG. 9, FIG. 9 is a schematic structural diagram of a network transport layer data processing device provided by an embodiment of the present application.

As shown in FIG. 9, the network transport layer data processing device provided by this embodiment includes: at least one processor 901; and a memory 902 in communication connection with the at least one processor.

In addition, in order to achieve fully-transparent transport encryption, or to jointly implement transport encryption with the upper layer application according to service requirements, the network transport layer data processing device further includes a management program that runs on a user plane and an eBPF program that runs on a kernel.

The management program is used for loading or registering the eBPF program into the kernel of an environment located, such that the eBPF program can run in the kernel. The memory 902 stores instructions executable by the at least one processor 901, and the instructions are executed by the at least one processor 901, so as to enable the at least one processor 901 to execute the network transport layer data processing method described by the above method embodiment applied to the management program, or the network transport layer data processing method described by the method embodiment applied to the eBPF program.

The memory 902 and the processor 901 are connected through a bus, the bus may include any number of interconnected buses and bridges, and the bus connects one or more processors 901 and various circuits of the memory 902 together. The bus may further connect various other circuits such as a peripheral device, a voltage stabilizer and a power management circuit together, which are publicly known in the art and therefore are not further described herein. A bus interface provides an interface between the bus and a transceiver. The transceiver may be one or more elements, such as a plurality of receivers and transmitters, providing a unit for communicating with various other apparatus over a transmission medium. Data processed by the processor 901 is transported on a wireless medium through an antenna, and the antenna further receives the data and transfers the data to the processor 901.

The processor 901 is responsible for managing the bus and general processing, and may further provide various functions, including timing, peripheral interfaces, voltage regulation, power management, and other control functions. The memory 902 may be used for storing the data used by the processor 901 during operation performing.

An embodiment of the present application further relates to a computer-readable storage medium, storing a computer program. The computer program, when executed by a processor, implements the network transport layer data processing methods described in the above method embodiments.

That is, those skilled in the art can understand that all or part of the steps in the above embodiments can be implemented by instructing the relevant hardware through a program, the program is stored in a storage medium and includes several instructions to enable a device (such as a single-chip computer, and a chip) or a processor to execute all or part of the steps of the methods described in the various embodiments of the present application. The aforementioned storage medium includes: a U disk, a mobile hard disk, a read-only memory (ROM), a random access memory (RAM), a magnetic disk or an optical disk and other media that can store program codes.

The ordinarily skilled in the art can understand that the above embodiments are specific embodiments for implementing the present application, and in practical applications, various changes can be made in form and details without deviating from the spirit and scope of the present application.

What is claimed is:

1. A network transport layer data processing method, applied to an extended Berkeley packet filter (eBPF) program that runs in a kernel, and comprising:
    acquiring a network transport layer data packet that needs to be distributed;
    parsing the network transport layer data packet, and determining a network transport layer data processing mode that needs to be performed on the network transport layer data packet; and
    processing the network transport layer data packet according to the network transport layer data processing mode;
    wherein parsing the network transport layer data packet, and determining the network transport layer data processing mode that needs to be performed on the network transport layer data packet comprise:
    parsing the network transport layer data packet, and extracting a protocol header of the network transport layer data packet;
    judging whether the network transport layer data packet needs to be encrypted or decrypted according to the protocol header and pre-configured encryption-decryption conditions, the encryption-decryption conditions being provided by a management program that runs on a user plane;
    determining, under the condition that the network transport layer data packet needs to be encrypted, that the network transport layer data processing mode that needs to be performed on the network transport layer data is an encryption processing mode; and
    determining, under the condition that the network transport layer data packet needs to be decrypted, that the network transport layer data processing mode that needs to be performed on the network transport layer data is a decryption processing mode.

2. The network transport layer data processing method according to claim 1, wherein the network transport layer data processing mode is the encryption processing mode; andprocessing the network transport layer data packet according to the network transport layer data processing mode comprises: selecting a target encryption rule from pre-configured encryption rules, the encryption rules being provided by the management program; performing encryption processing on a load part of the network transport layer data packet according to the target encryption rule; updating the protocol header according to the encrypted load part to obtain the encrypted network transport layer data packet; and handing over the encrypted network transport layer data packet to the kernel, and distributing the encrypted network transport layer data packet through the kernel.

3. The network transport layer data processing method according to claim 1, wherein the network transport layer data processing mode is the decryption processing mode; and processing the network transport layer data packet according to the network transport layer data processing mode comprises: selecting a target decryption rule from pre-configured decryption rules, the decryption rules being provided by the management program; performing decryption processing on a load part of the network transport layer data packet according to the target decryption rule; updating the protocol header according to the decrypted load part to obtain the decrypted network transport layer data packet; and handing over the decrypted network transport layer data packet to the kernel, and distributing the decrypted network transport layer data packet through the kernel.

4. The network transport layer data processing method according to claim 1, further comprising:
receiving a configuration information update instruction issued by the management program that runs on the user plane; and
updating pre-configured configuration information according to the configuration information update instruction, the configuration information comprising any one or more of the encryption-decryption conditions, the encryption rules, and the decryption rules.

5. A network transport layer data processing method, applied to a management program that runs on a user plane, and comprising:
monitoring, after the management program is started, whether an operation instruction for an eBPF program that runs in a kernel and/or statistical data for a network transport layer data packet processing process collected by the eBPF program are/is received;
processing the eBPF program according to the operation instruction under the condition that the operation instruction for the eBPF program is received; and
processing the statistical data under the condition that the statistical data for the network transport layer data packet processing process collected by the eBPF program is received, the eBPF program is used to parse the network transport layer data packet. determine a network transport layer data processing mode that needs to be performed on the network transport layer data packet: and process the network transport layer data packet according to the network transport layer data processing mode; wherein program is used to parse the network transport layer data packet, determine a network transport layer data processing mode that needs to be performed on the network transport layer data packet comprise:
parsing the network transport layer data packet, and extracting a protocol header of the network transport layer data packet;
judging whether the network transport layer data packet needs to be encrypted or decrypted according to the protocol header and pre-configured encryption-decryption conditions, the encryption-decryption conditions being provided by a management program that runs on a user plane;
determining, under the condition that the network transport layer data packet needs to be encrypted, that the network transport layer data processing mode that needs to be performed on the network transport layer data is an encryption processing mode; and
determining, under the condition that the network transport layer data packet needs to be decrypted, that the network transport layer data processing mode that needs to be performed on the network transport layer data is a decryption processing mode.

6. The network transport layer data processing method according to claim 5, wherein the operation instruction is a configuration information update instruction, or an eBPF program replacement instruction, or an eBPF program uninstalling instruction; and
processing the eBPF program according to the operation instruction under the condition that the operation instruction for the eBPF program is received comprises:
extracting, when the operation instruction is the configuration information update instruction, extract configuration information that needs to be updated from the configuration information update instruction, and updating a configuration information mapping table corresponding to the eBPF program according to the extracted configuration information that needs to be updated;
extracting, when the operation instruction is the eBPF program replacement instruction, a replacement eBPF program from the eBPF program replacement instruction, registering the replacement eBPF program in a kernel, and uninstalling the eBPF program that runs in the kernel after the replacement eBPF program is registered in the kernel; and
uninstalling the eBPF program that runs in the kernel when the operation instruction is the eBPF program uninstalling instruction.

7. The network transport layer data processing method according to claim 5, wherein processing the statistical data under the condition that the statistical data for the network transport layer data packet processing process collected by the eBPF program is received comprises:
storing the statistical data in a preset storage area and/or displaying the statistical data in a preset form.

8. The network transport layer data processing method according to claim 5, wherein before monitoring, after the management program is started, whether the operation instruction for the eBPF program that runs in the kernel and/or the statistical data for the network transport layer data packet processing process collected by the eBPF program are/is received, the method further comprises:
reading configuration information from a preset address, the configuration information comprising any one or more of encryption-decryption conditions, encryption rules, and decryption rules;
checking integrity of the eBPF program that needs to be registered into the kernel and the configuration information;
registering, under the condition that the eBPF program and the configuration information are complete, the eBPF program into the kernel, such that the eBPF program runs in the kernel; and
configuring the configuration information into the configuration information mapping table corresponding to the eBPF program.

9. A network transport layer data processing device, comprising: a management program that runs on a user plane, an eBPF program that runs in a kernel, at least one processor, and a memory, in communication connection with the at least one processor, wherein
the management program is used for loading the eBPF program into the kernel of an environment located, such that the eBPF program runs in the kernel, the memory stores instructions executable by the at least one processor, and the instructions are executed by the at least one processor, so as to enable the at least one processor to execute the network transport layer data processing method according to claim 1.

10. A computer-readable storage medium, storing a computer program, and the computer program, when executed by a processor, implementing the network transport layer data processing method according to claim 1.

11. The network transport layer data processing method according to claim 1, further comprising:
receiving a configuration information update instruction issued by the management program that runs on the user plane; and
updating pre-configured configuration information according to the configuration information update instruction, the configuration information comprising any one or more of the encryption-decryption conditions, the encryption rules, and the decryption rules.

12. The network transport layer data processing method according to claim 2, further comprising:
receiving a configuration information update instruction issued by the management program that runs on the user plane; and
updating pre-configured configuration information according to the configuration information update instruction, the configuration information comprising any one or more of the encryption-decryption conditions, the encryption rules, and the decryption rules.

13. The network transport layer data processing method according to claim 3, further comprising:
receiving a configuration information update instruction issued by the management program that runs on the user plane; and
updating pre-configured configuration information according to the configuration information update instruction, the configuration information comprising any one or more of the encryption-decryption conditions, the encryption rules, and the decryption rules.

14. The network transport layer data processing method according to claim 1, further comprising:
receiving a data packet with illegal content sent by an upper layer application;
fixing a data in the data packet with illegal content; and
sending the data to the kernel.

15. The network transport layer data processing method according to claim 6, wherein processing the statistical data under the condition that the statistical data for the network transport layer data packet processing process collected by the eBPF program is received comprises:
storing the statistical data in a preset storage area and/or displaying the statistical data in a preset form.

16. The network transport layer data processing method according to any one of claim 6, wherein before monitoring, after the management program is started, whether the operation instruction for the eBPF program that runs in the kernel and/or the statistical data for the network transport layer data packet processing process collected by the eBPF program are/is received, the method further comprises:
reading configuration information from a preset address, the configuration information comprising any one or more of encryption-decryption conditions, encryption rules, and decryption rules;
checking integrity of the eBPF program that needs to be registered into the kernel and the configuration information;
registering, under the condition that the eBPF program and the configuration information are complete, the eBPF program into the kernel, such that the eBPF program runs in the kernel; and
configuring the configuration information into the configuration information mapping table corresponding to the eBPF program.

17. The network transport layer data processing method according to any one of claim 7, wherein before monitoring, after the management program is started, whether the operation instruction for the eBPF program that runs in the kernel and/or the statistical data for the network transport layer data packet processing process collected by the eBPF program are/is received, the method further comprises:
reading configuration information from a preset address, the configuration information comprising any one or more of encryption-decryption conditions, encryption rules, and decryption rules;
checking integrity of the eBPF program that needs to be registered into the kernel and the configuration information;
registering, under the condition that the eBPF program and the configuration information are complete, the eBPF program into the kernel, such that the eBPF program runs in the kernel; and
configuring the configuration information into the configuration information mapping table corresponding to the eBPF program.

18. A network transport layer data processing device, comprising: a management program that runs on a user plane, an eBPF program that runs in a kernel, at least one processor, and a memory, in communication connection with the at least one processor, wherein
the management program is used for loading the eBPF program into the kernel of an environment located, such that the eBPF program runs in the kernel, the memory stores instructions executable by the at least one processor, and the instructions are executed by the at least one processor, so as to enable the at least one processor to execute the network transport layer data processing method according to claim 5.

19. A computer-readable storage medium, storing a computer program, and the computer program, when executed by a processor, implementing the network transport layer data processing method according to claim 5.

* * * * *